Aug. 4, 1953

R. B. WATSON 2,647,813

POLAR CHART RECORDER

Filed Jan. 5, 1946

INVENTOR
ROBERT B. WATSON

BY

ATTORNEY

Aug. 4, 1953  R. B. WATSON  2,647,813
POLAR CHART RECORDER
Filed Jan. 5, 1946  6 Sheets-Sheet 2

INVENTOR
ROBERT B. WATSON
BY M. O. Hayes
ATTORNEY

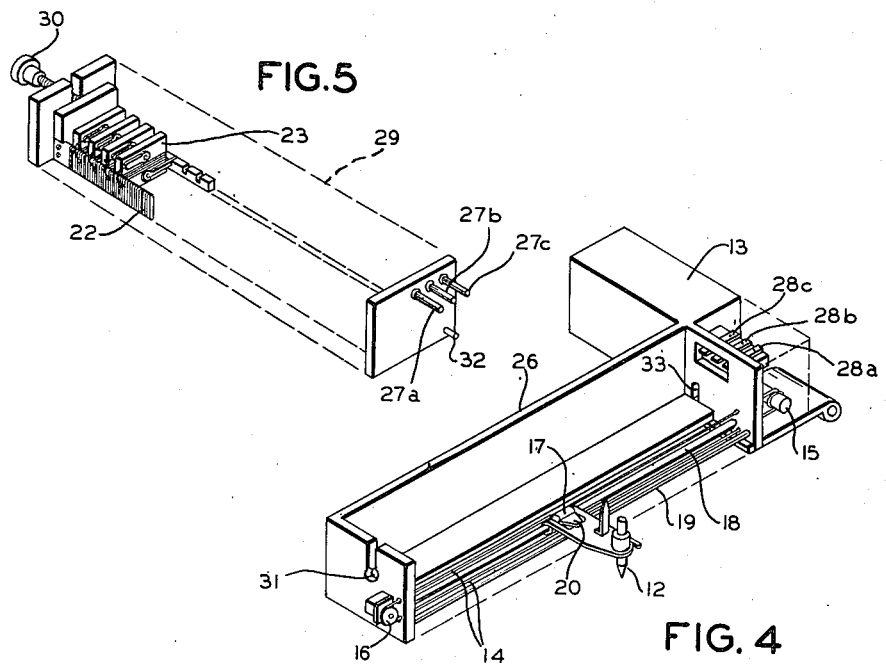
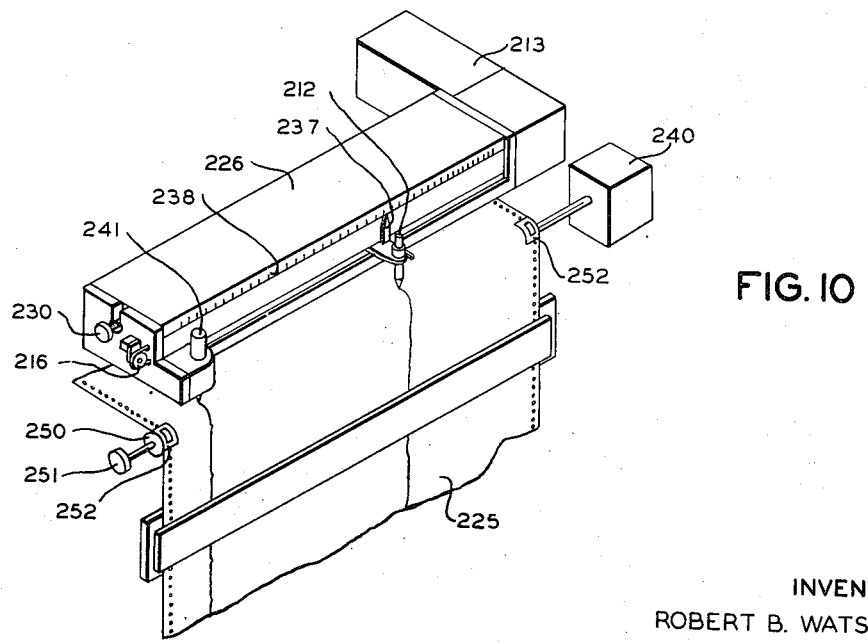

Aug. 4, 1953 — R. B. WATSON — 2,647,813
POLAR CHART RECORDER
Filed Jan. 5, 1946 — 6 Sheets-Sheet 5

INVENTOR
ROBERT B. WATSON
BY M. P. Hayes
ATTORNEY

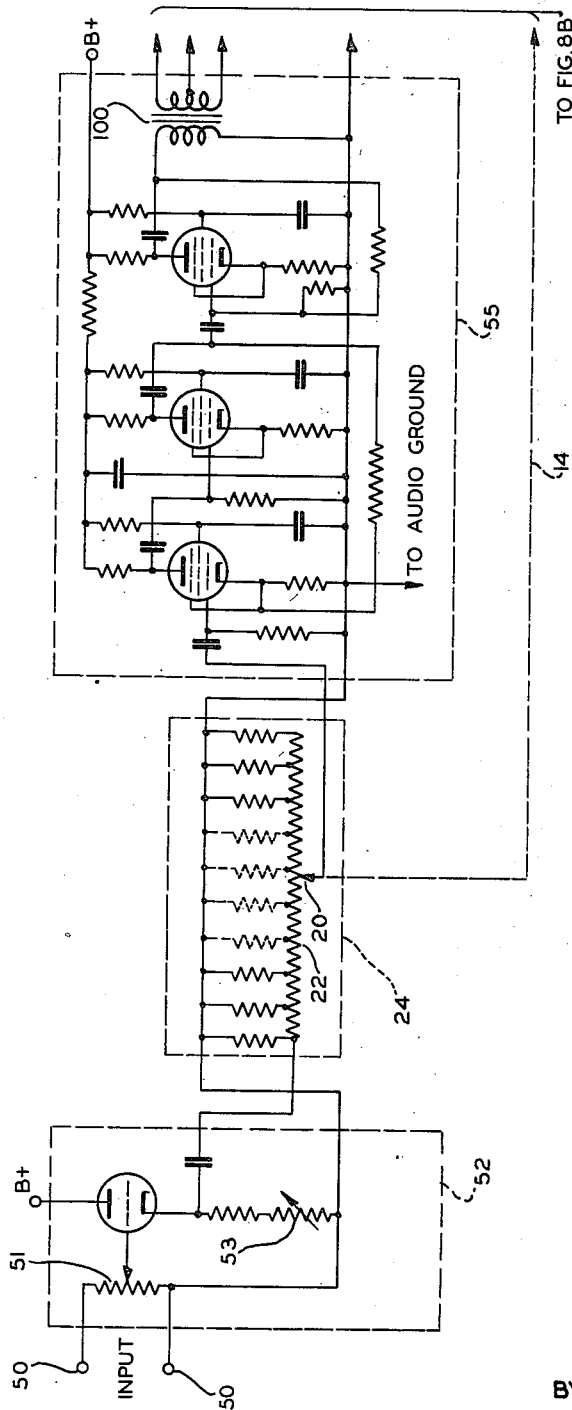

Patented Aug. 4, 1953

2,647,813

UNITED STATES PATENT OFFICE 2,647,813

POLAR CHART RECORDER

Robert B. Watson, Austin, Tex., assignor to the United States of America as represented by the Secretary of the Navy Application January 5, 1946, Serial No. 639,277

5 Claims. (Cl. 346—33)

This invention relates to devices for recording the energy levels of electrical signals, and in particular to recorders which are actuated by the power level in an electrical circuit of a device such as a microphone.

There are known to the art a number of power level recorders which move a marking pen or stylus over a moving chart of recording paper in response to an input signal to give a permanent, calibrated record of the power output level of a device such as a microphone under varying conditions as, for example, a changing orientation of the microphone in a sound field. Most of these devices utilize a frictionally operated stylus and a drive operated by a synchronous motor to give a uniform rate of paper travel. These last-mentioned devices suffer from the common defect that the friction of the stylus drive does not remain constant, so the displacement of the stylus from its zero position for a given signal level does not remain the same, thus requiring repeated calibration of the recorder. The above-described devices are also subject to the disadvantage that since the movement of the paper is a function of time only, it bears no established relation to the variation in the conditions imposed upon the device under test. Various other known recording devices are further limited in their application by the speed with which the stylus can be moved in response to a sudden change in input signal level.

One use of power level recorders of the type to which the present invention pertains is in the calibration of hydrophones, and the common practice is to set the instrument under test in a field constant with time from a sound source, rotate it about an axis, and record the power output level as the hydrophone is rotated. During this rotation the output of the hydrophone changes, being a maximum when the hydrophone is facing directly toward the sound source. The directional pattern thus obtained is useful in determining the suitability of the hydrophone for a particular application. As above stated, the power level recorders now in common use have no established and uniform relation between the movement of the chart or paper driving motor and the motor used to rotate the hydrophone. This necessitates a periodic marking of the record as it is being made with indicia which will relate the record trace to the orientation of the hydrophone and thus permit later interpretation of the record.

It is a primary object of this invention to provide a power level recorder which will be free from these defects, will operate smoothly and rapidly without repeated calibration, and will furnish a complete and immediately readable record.

Another object of this invention is to provide a stylus drive for a power level recorder which substantially eliminates friction as a driving force and which is capable of following rapid changes in input signal level through a usefully long stroke without hunting.

It is also an object of this invention to provide a power level recorder which will produce "polar" diagrams directly during the measuring procedure so that the relation between the orientation of the device under test and the recorded output level is apparent by visual inspection.

Other objects and advantages of the invention will become apparent from the following detailed description of a preferred embodiment thereof and from the accompanying drawings in which:

Figs. 4 and 5 are perspective views with parts broken away of the disassembled parts of a pen drive and attenuator unit respectively;

Figs. 8A and 8B show the circuit diagram of the amplifier unit and pen driving motor;

Fig. 10 is a fragmentary perspective view of a strip type of recorder embodying the invention.

Figure 1:
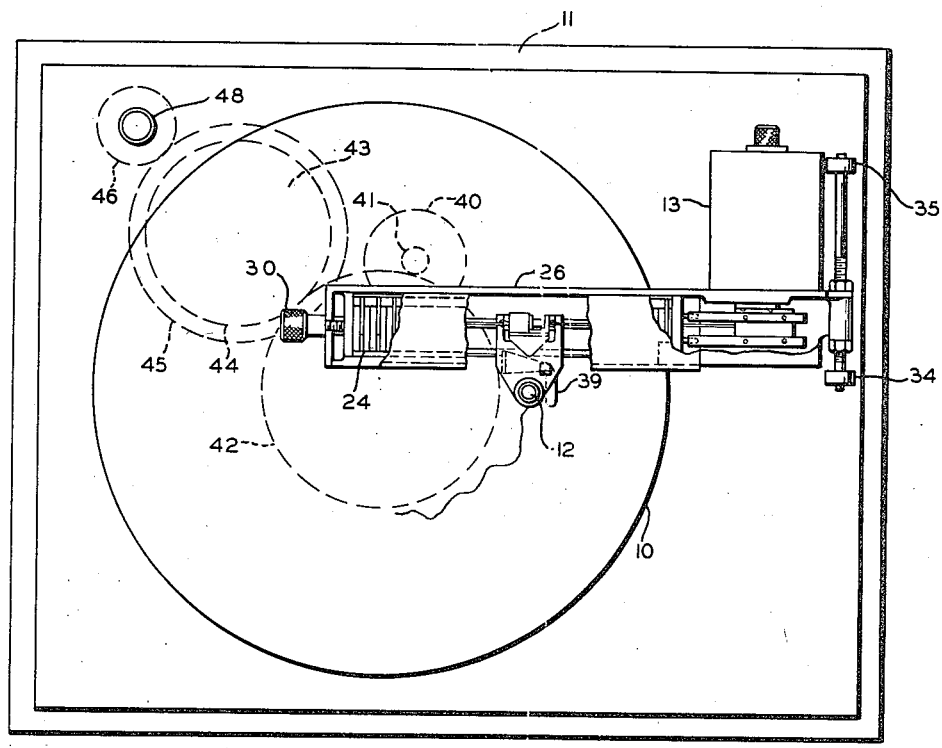
Fig. 1 is a top plan view of an apparatus embodying the present invention.
Figure 2:
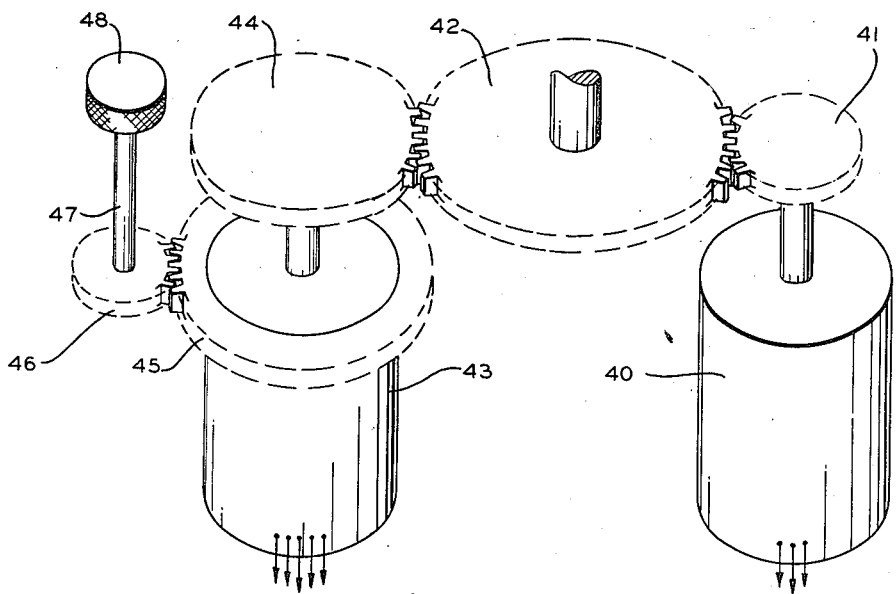
Fig. 2 is a diagrammatic perspective view showing the relation between the table drive motor and its associated synchro.

Referring to Fig. 1, one embodiment of the invention is shown applied to a recorder which makes directly readable polar diagrams of, for example, the power output of a hydrophone as it is changed in orientation in a sound field. Turntable 10 is mounted over housing 11 and has disposed over it pen 12. Pen (or stylus) 12 is driven radially with respect to turntable 10 in a manner hereinafter described, being actuated by drive motor 13 through the medium of a chain or string drive. The slide along which pen 12 moves is mounted on housing 26 containing attenuator unit 24, which housing with pen motor 13 is pivotally mounted on hinges 34 and 35 to permit it to be swung vertically away from turntable 10. Turntable driving motor 40 and synchro 43 are disposed within main housing 11. The details of the gear connections are shown in Fig. 2. Motor 40 has on its shaft pinion 41 meshing with spur gear 42 fixed to the turntable shaft. To the rotor shaft of synchro 43 is attached a gear 44 which meshes with gear 42 so that any movement of turntable 10 is followed by synchro 43. For the purpose of making an initial zero setting of synchro 43, the stationary element thereof is provided with gear 45 which meshes with driving pinion 46, shaft 47 of which extends out of housing 11 and terminates in knob 48. Thus knob 48 may be used to rotate the body of synchro 43 for zero positioning without disturbing the setting of gear 44 or moving turntable driving motor 40.

The relation between turntable driving motor 40 and its associated synchro 43 is such that motor 40 drives turntable 10 until the rotor of synchro 43 assumes a balanced position. The servo or follow-up amplifier of a type suitable for this application is conventional and forms no part of the present invention.

Figure 3:
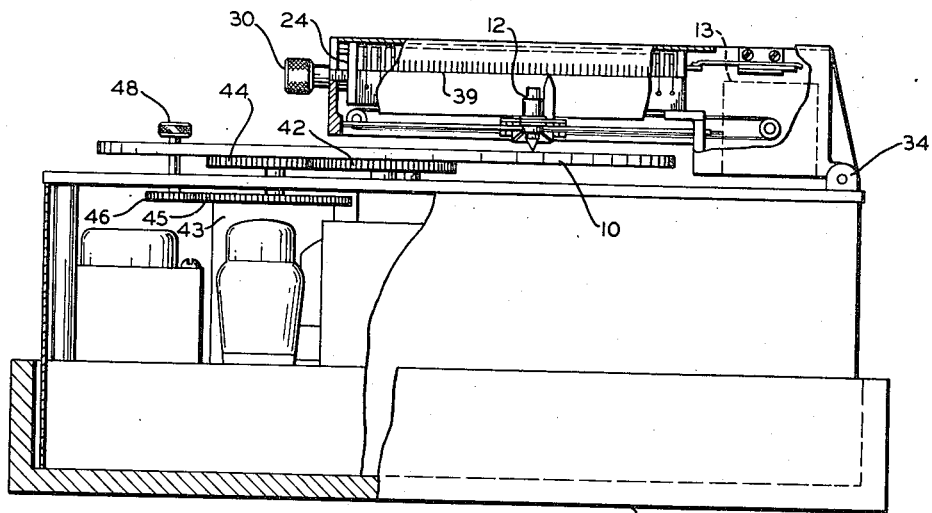
Fig. 3 is a side elevation, with parts broken away, of the apparatus shown in Fig. 1.

Fig. 3 is a side elevation with parts broken away of the apparatus shown in Fig. 1 and provides a clearer view of the manner in which the various parts are disposed within and upon housing 11.

In Figs. 4 and 5 the pen drive and attenuator units of this embodiment of the invention are shown disassembled. In Fig. 4 pen 12 is driven by string 14 which is shown wrapped over drum 15 on the shaft of driving motor 13, trained over idler pulley 16, and fastened to shoe 17 on which the pen is carried. Shoe 17 is guided in its longitudinal movement by spaced slide 18 and rod 19 over which shoe 17 is slipped in mounting. Shoe 17 is sufficiently extensive so that there is no cocking or binding of the shoe with respect to guiding members 18 and 19, and pen 12 moves smoothly and with little friction. Shoe 17 carries, in addition to pen 12, sliding contact 20 which makes contact with resistance strip 22 forming a part of the attenuator of Fig. 5.

Figure 6:
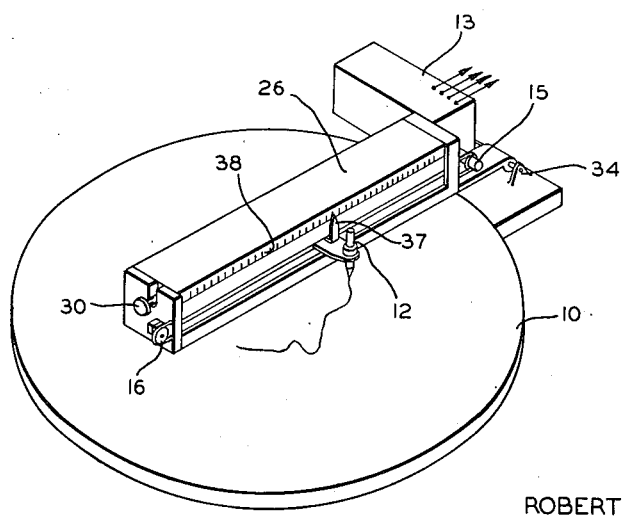
Fig. 6 is a diagrammatic perspective view of the pen and attenuator unit in place over a turntable.

In Fig. 5 frame 29 encloses resistance strip 22 and a plurality of shunt resistors 23 which are combined in the present instance to form a logarithmic attenuator. Electrical contact to the attenuator formed by resistance strip 22 and shunt resistors 23 is made through contact pins 27a, 27b, and 27c which cooperate with spring fingers 28a, 28b, and 28c mounted on housing 26. To assemble, frame 29, as shown in Fig. 5, is slipped into housing 26, as shown in Fig. 4, and is held in place by locking nut 30 which engages slot 31 in the end of housing 26. A locating dowel 32 is provided which enters hole 33 in the rear of housing 26 for the purpose of properly positioning frame 29 therein. The unit thus formed by the combination of the parts shown in Figs. 4 and 5 is referred to as attenuator unit 24. The manner in which housing 26 of attenuator unit 24 and the associated pen driving motor 13 is mounted over turntable 10 is shown more clearly in Fig. 6.

Figures 7A, 7B:
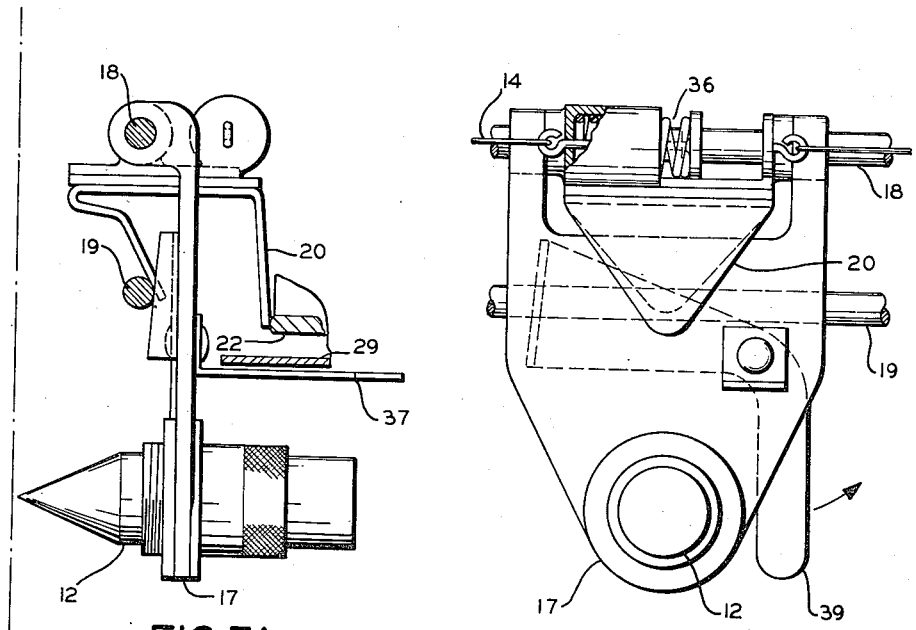
Fig. 7A is a side view of the pen supporting shoe and guiding tracks.
Fig. 7B is a top view of the pen supporting shoe and guiding tracks.

Figs. 7A and 7B show in greater detail the pen assembly described with reference to Fig. 4. In Fig. 7A the manner of mounting shoe 17 on guiding members 18 and 19 can be seen, as well as the manner in which sliding contact 20 completes the electrical circuit between resistance strip 22 and guiding member 19 which also serves as one of the attenuator leads. A pointer 37 which moves along decibel scale 38 (Fig. 6) is also shown in Fig. 7A. Fig. 7B shows, in addition to the parts already described, spring 36 which provides proper tension for the drive string 14, and pen lifter 39.

Figure 8B:
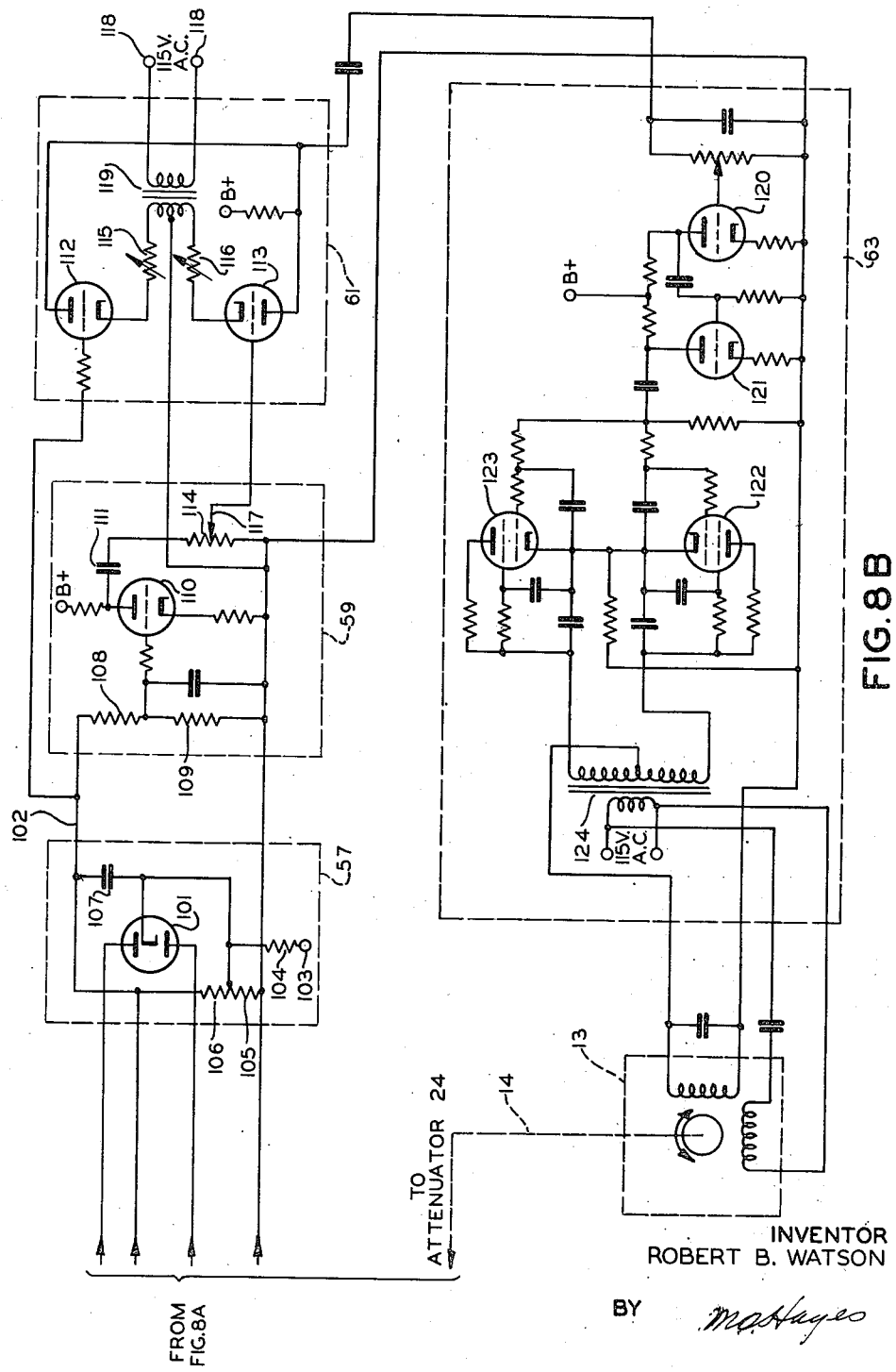

Pen motor 13 is caused to drive pen 12 over turntable 10 in response to the signals from a device such as a microphone through the medium of a suitable amplifier. The circuit diagram of such an amplifier and its connections to attenuator 24 and pen drive motor 13 are shown in Figs. 8A and 8B. In Fig. 8A the input from the device under test enters through terminals 50 into gain control and impedance matching unit 52 comprising a cathode follower stage with manual gain controls 51 and 53. Potentiometer 51 has a stepwise variation and is used for "coarse" control, where potentiometer 53 is continuously variable and is used for "fine" control.

The cathode follower stage is used to match the high impedance of the input to the low impedance of the attenuator of unit 24 to which it is directly connected. Gain control 53 is utilized to set the recorder to a reference level. For example, if the full recorder throw, or maximum allowable displacement of pen 12, is 5 inches, gain control 53 is so adjusted as to make the maximum output of the device under test cause a displacement of pen 12 of 5 inches. The reference level so established is then taken as a zero decibel value, and the output is recorded directly in decibels relative to this level. The motion of pen 12 as caused by motor 13 and the amplifier shown in Figs. 8A and 8B is such as to move contactor 20, which is constrained to move with pen 12, over resistance strip 22 of attenuator 24 in such a fashion as to keep the output of attenuator 24 to voltage amplifier 55 constant at all times. The overall cycle of action is as follows. A change in input signal to gain control unit 52 causes a change in the output of attenuator 24 to voltage amplifier 55. The output of voltage amplifier 55 to reference unit 57 (Fig. 8B) is also changed, causing an unbalanced output from modulator 61 to be fed to power amplifier 63. The output of power amplifier 63 is fed to pen driving motor 13, causing it to move pen 12 until the associated contactor 20 is so positioned on resistance strip 22 of attenuator 24 that the input signal to voltage amplifier 55 regains its original value. Since attenuator 24 is wound logarithmically, the position of contactor 20 will be a logarithmic function of the input signal level to unit 52.

Voltage amplifier 55 is conventional and need not be further described. As seen in Fig. 8A, amplifier 55 terminates at a center tapped transformer 100, the end points of which feed into the anodes of rectifier tube 101 of reference unit 57. The center tap of transformer 100 is connected through lead 102 directly to the grid of tube 112 of balanced modulator 61 and to the input circuit of derivative control unit 59. As may be seen from the circuit diagram, the reference circuit consisting of resistor 106 and capacitor 107 in parallel in the cathode circuit of tube 101 is biased to the difference of the voltage existing at the center tap of transformer 100 and the cathode of tube 101 when there is the constant balance voltage signal from amplifier 55. The cathode bias voltage of tube 101 is established by a suitable source of potential connected to terminal 103 and a voltage divider consisting of resistors 104 and 105 in series, and that voltage is further divided by resistors 106, and 108 and 109 to establish the reference voltage at the center tap of transformer 100. There will be no rectifier output then until the output of voltage amplifier 55 is sufficient to overcome this cathode bias on tube 101. When the output of amplifier 55 exceeds this bias value, the voltage carried by lead 102 will be the difference between the reference voltage at the center tap of transformer 100 and the rectified output of rectifier 101. This reference circuit with its bias obtained from the potential supply connected to terminal 103 determines the amplitude of the signal which must be developed by voltage amplifier 55 to produce a zero or any other balance voltage at lead 102.

As has been stated, the difference voltage output appearing at lead 102 is fed directly to the grid of modulator tube 112, and in addition is also fed through a voltage divider network to the grid of tube 110 of derivative control unit 59. In the plate circuit of tube 110 is capacitor 111, which in series with resistor 114 comprises a differentiating circuit. When tube 110 is drawing a steady current capacitor 111 is charged but carries no current. If the potential at the grid of tube 110 changes, the current drawn by tube 110 will change and part of the resulting output will be fed through capacitor 111 and resistor 114 to the grid of tube 113, and this signal will be proportional to the derivative of the output of tube 110. That is, the magnitude of the signal applied to the grid of tube 113 will depend not only on the magnitude of the output of tube 110 but also upon the rapidity with which the output changes. The more rapid the change in the grid voltage applied to tube 110, the greater the portion of the output fed through capacitor 111 to the grid of tube 113.

Analyzing the device from the standpoint of the phase relation between the input and output of unit 59, it will be seen that this output depends upon the tube characteristics of tube 110 and on the relative values of capacitor 111 and resistor 114. There is a phase reversal in tube 110 and a phase lead caused by the RC circuit consisting of capacitor 111 and resistor 114. The phase reversal is required to impress a signal on tube 113 of balanced modulator 61 which is opposite in phase to the signal impressed on the grid of tube 112. The phase lead has been found desirable to prevent hunting of motor 13. Since tap 117 on resistor 114 is variable, the magnitude and phase of the signal applied to the grid of tube 113 can be varied as desired.

The cathodes of tubes 112 and 113, comprising the balanced modulator unit 61, are connected to opposite ends of center tapped transformer 119 through adjusting resistors 115 and 116, the primary of transformer 119 being connected to a 60 cycle supply at terminals 118. The 60 cycle alternating voltages thus impressed on the cathodes of tubes 112 and 113 are 180° out of phase, assuming that the tubes have identical characteristics or are properly balanced to identify by resistors 115 and 116. If the potentials on the grids of tubes 112 and 113 are equal, the outputs of the two tubes to the common plate circuit will be equal and out of phase and hence cancel one another. It is preferred, however, to operate tubes 112 and 113 at such a point that they will pass only the negative half cycles applied to their cathodes. This will cause a positive 120 cycle wave or ripple to appear in the output of modulator 61.

Unit 61 performs the functions of both a balanced modulator and a mixer, combining the difference voltage output of unit 57 and the derivative of that difference voltage. If the difference voltage appearing at lead 102 changes toward a more positive value, the grid of tube 112 likewise goes positive so that tube 112 passes more alternating current and that portion of the modulator output ascribable to tube 112 and fed to power amplifier 63 is increased. Simultaneously the grid of tube 110 goes positive, feeding a negative signal proportional to the derivative of the difference voltage to the grid of tube 113 and thus decreasing the part of the modulator output in opposite phase to the output of tube 112. This combination of effects supplies a 60 cycle signal in phase with the output of tube 112 to the input of power amplifier 63.

If the difference voltage output appearing at lead 102 goes negative, the grid of tube 112 goes negative, decreasing the output of the modulator in that phase. Simultaneously the negative signal on the grid of tube 110 will cause a positive signal proportional to the derivative of the difference voltage to appear on the grid of tube 113, increasing its conduction and so supplying to power amplifier 63 a 60 cycle signal opposite in phase to that initiated by a positive change in the output of reference unit 57.

Power amplifier 63 may be any conventional type which will satisfactorily amplify the output of modulator 61 to a level sufficient to drive motor 13. Fig. 8B shows one possible form of this power amplifier, consisting of two resistance-capacitance coupled amplifier stages at 120 and 121, followed by a pair of balanced, grid-controlled rectifiers 122 and 123. The plates of tubes 122 and 123 are connected to opposite ends of a secondary winding of transformer 124, the primary of which is fed from the same 60 cycle supply as transformer 119, and hence these plates are supplied with alternating voltages which are 180° out of phase. Since the grids of tubes 122 and 123 receive the same 60 cycle output of tube 121, this signal will be in phase with the plate voltage on one of tubes 122 and 123 and out of phase with the plate voltage of the other. In this fashion tube 122 or tube 123 will conduct to an enhanced degree depending upon the phase of the signal applied to the input of power amplifier 63.

Driving motor 13 is a two-phase motor having one phase connected across a power source, in this instance the primary of transformer 124, and the other winding is connected to receive the output of tubes 122 and 123. The phase of the current in this second winding and hence the direction of rotation of motor 13 will depend upon which of tubes 122 and 123 is conducting most heavily. This in turn is goverened by the phase of the output of modulator 61 and hence by the direction of the unbalance in the output of reference unit 57. Motor 31 drives pen 12 across the chart paper on turntable 10 of Fig. 1 and as seen in Fig. 8A moves contactor 20 along attenuator 24 until the signal input to voltage amplifier 55 has reached the balance value.

By driving motor 13 with a voltage resulting not only from the reference voltage output of differencer unit 57 but also from the derivative of that difference voltage, the pen drive system responds much more quickly and with greater certainty than if the difference voltage alone were used. This substantially eliminates the tendency of pen 12 to hunt about the balance point and increases the useful range of operation. The 120 cycle ripple voltage which is the normal output of modulator 61 will result in a 120 cycle output from rectifiers 122 and 123. This will not drive motor 13 but does cause it to vibrate without apparent rotation in either direction. This results in keeping motor 13 in a state of readiness so that when one phase or the other predominates in the output of modulator 61, motor 13 will immediately rotate and thus respond very quickly to any change in the output of modulator 61.

Figure 9:
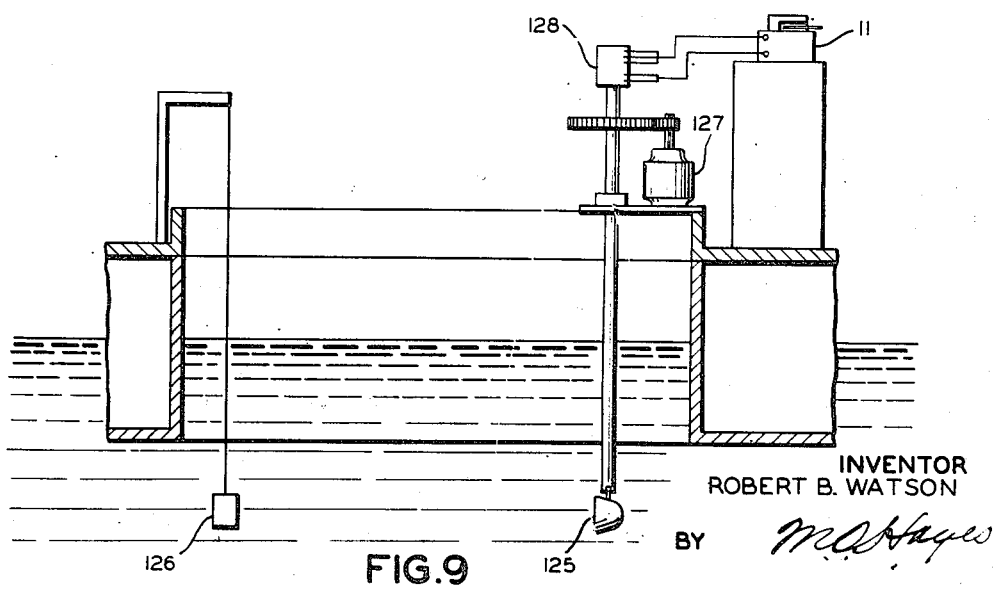
Fig. 9 is a diagrammatic illustration of one manner in which the recorder may be used.

In Fig. 9 is shown a test arrangement for taking the output pattern of hydrophone 125 which is placed in a sound field set up by projector 126. Assuming that hydrophone 125 has a directional pattern which it is desired to investigate, hydrophone 125 is turned in the sound field by any suitable driving motor 127. A synchro 128 is fixed to the top of the driving shaft on which hydrophone 125 is mounted and is electrically connected to synchro 43 in the recorder unit. The operator places a chart of suitably ruled paper on turntable 10, establishes the proper zero point by adjusting knob 48 and starts driving motor 127. As the shaft supporting hydrophone 125 is turned, synchro 128 causes synchro 43 to produce an electrical signal which is amplified and fed to turntable motor 40, causing turntable 10 to be rotated in synchronism with the rotation of hydrophone 125. As hydrophone 125 changes its orientation in the sound field set up by source or projector 126, its response will likewise change and pen 12 will be driven as described above and trace out the pattern of the response curve directly on the paper carried by turntable 10.

This invention has thus far been described in connection with a polar type of recorder, but it can be similarly applied to a strip type as shown in Fig. 10. The numbers denoting the various parts in Fig. 10 are the same as the numbers assigned to the similar parts in the previous figures but have the number 2 preceding the previous number. For example, motor 213 in Fig. 10 is similar to pen motor 13 in Fig. 1. As shown in Fig. 10 attenuator unit 224 overlies strip of paper 225 and pen or stylus 212 is driven by driving motor 213, which operates in exactly the same manner as driving motor 13 described with reference to Fig. 7. A paper transport motor 240 is provided to operate paper drive drum 250 which is also equipped with a manual transport knob 251 and paper hold down clips 252. Motor 240 may be synchronized in its movement with the movement of hydrophone driving motor 127 (Fig. 9). However, if paper transport motor 240 is to operate independently of the motion of the hydrophone, a marking pen 241 must be used to mark the chart in accordance with the position of the hydrophone. Marking pen 241 may be operated manually or automatically in response to any desired mechanism in conjunction with hydrophone driving motor 127 (Fig. 9).

While certain applications and a preferred form of the invention have herein been disclosed, other applications and forms will be apparent to those skilled in the art. The scope of the invention is limited only by the appended claims.

What is claimed is:

1. A recorder of alternating current power level including a stylus, a stylus driving motor, means generating a signal input voltage corresponding to the condition to be measured, an input attenuator adjusted with said stylus in a manner such that the resistance offered thereby is a function of stylus position, means applying said input signal voltage to said attenuator means to amplify and rectify said signal input voltage after it has passed through said attenuator, a balanced alternating current modulator, a reference voltage source, means to impress on one side of said modulator a voltage equal to the difference between said rectified attenuated signal voltage and a reference voltage from said source, means to impress on the other side of said balanced modulator a voltage which varies in accordance with the derivative of said difference voltage, and means to operate said stylus driving motor from the output of said balanced modulator to alter the attenuator position and bring the recorder to a balance point.

2. A recorder for energy sensitive devices having an alternating current power output comprising, a stylus, a stylus driving motor, an attenuator adjusted simultaneously with said stylus in a manner such that the resistance offered thereby is a function of the position of said stylus, said attenuator being fed by the output signals from a device under test, an amplifier fed by the output of said attenuator, a rectifier fed by said amplifier, a reference voltage source, a balanced alternating current modulator, one side of said modulator being fed by the difference between the output of said rectifier and a reference voltage from said source and the other side of said modulator being fed by a voltage which varies in accordance with the derivative of said difference voltage, and a power amplifier fed by said balanced modulator, said driving motor being operated by the output of said power amplifier and causing said stylus to move in accordance with the amplitude of said signals from said device under test, said motion of said stylus altering said attenuator position to bring the recorder to a balance point.

3. A self-balancing recorder comprising, a stylus, an alternating current operated stylus driving motor, a source of alternating voltage to be recorded, an input attenuator means for applying said voltage to said attenuator, said attenuator having a predetermined characteristic and adjustable simultaneously with said stylus in such a manner that the attenuation offered thereby is a function of stylus position, a rectifier for said attenuator output voltage, a reference voltage, means responsive to said reference voltage and said rectified attenuator output voltage to derive a difference voltage having amplitude and polarity related to amount and direction of unbalance, a differential network responsive to said difference voltage to derive a voltage proportional to the derivative of said difference voltage, a balanced alternating current modulator having two input circuits independently responsive to said difference voltage and said derivative voltage respectively to produce an alternating voltage having amplitude and phase related to amount and direction of unbalance and rate of change of unbalance, and means applying said alternating voltage to energize said stylus driving motor whereby said attenuator is adjusted so as to reduce said difference voltage to zero.

4. A self-balancing recorder comprising, a stylus, an alternating current operated stylus driving motor, a source of alternating voltage to be recorded, an input attenuator responsive to voltage from said source and having a predetermined characteristic adjustable simultaneously with said stylus in such a manner that the attenuation offered thereby is a function of stylus position, a rectifier for converting said attenuator output voltage to a unidirectional voltage, a reference voltage, means responsive to said reference voltage and said rectified attenuator output voltage to derive a difference voltage having amplitude and polarity related to amount and direction of unbalance, a differential network responsive to said difference voltage to derive a voltage proportional to the derivative of said difference voltage, a balanced alternating current modulator having two independent input circuits, one of said input circuits being responsive to said difference voltage and the second of said input circuits being responsive to said derivative voltage to produce an alternating voltage having amplitude and phase related to amount and direction of unbalance and rate of change of unbalance, and means applying said alternating voltage to energize said stylus driving motor to adjust said attenuator to reduce said difference voltage to zero, whereby said input alternating voltage is attenuated in proportion to its amplitude.

5. A self-balancing test device power level recorder including a stylus, a stylus driving motor, an attenuator having a series impedance between input and output terminals thereof, an adjustable tap operative over said series impedance and a plurality of impedances shunting said series impedance at predetermined points whereby a logarithmic attenuation characteristic is obtained, said tap being adjustable simultaneously with said stylus in such a manner that the attenuation introduced by said attenuator is the logarithmic function of the position of said stylus, said attenuator being fed at its input terminal by the output of said test device, means to amplify and rectify the output of said attenuator, a reference voltage, means responsive to said reference voltage and said rectified attenuator output voltage to derive a difference voltage having amplitude and polarity related to amount and direction of unbalance, a differential network responsive to said difference voltage to derive a voltage proportional to the derivative of said difference voltage, a balanced alternating current modulator having two independent input circuits, one of said input circuits being responsive to said difference voltage and the second of said input circuits being responsive to said derivative voltage to produce an alternating voltage having amplitude and phase related to amount, direction and rate of change of unbalance, a power amplifier fed by said balanced modulator, and means for applying the output of said power amplifier to said stylus driving motor to cause said stylus to move in accordance with the amplitude of the signals from said test device, said motion of said stylus altering said attenuator position to bring said recorder to a balance point.

ROBERT B. WATSON.

References Cited in the file of this patent

UNITED STATES PATENTS

| Number | Name | Date |
|---|---|---|
| 1,915,321 | Kincaid | June 27, 1933 |
| 2,234,573 | Neumann | Mar. 11, 1941 |
| 2,270,991 | Bagno | Jan. 27, 1942 |
| 2,272,914 | Keeler | Feb. 10, 1942 |
| 2,376,598 | Jones | May 22, 1945 |
| 2,376,599 | Jones | May 22, 1945 |
| 2,385,481 | Wills | Sept. 25, 1945 |
| 2,401,019 | Rieber | May 28, 1946 |
| 2,409,970 | Agins | Oct. 22, 1946 |
| 2,464,708 | Moseley | Mar. 15, 1949 |
| 2,516,389 | Hurvitz | July 25, 1950 |